United States Patent

[11] 3,580,326

| [72] | Inventor | Albert Edwards |
| --- | --- | --- |
| | | Ailsworth, near Peterborough, England |
| [21] | Appl. No. | 810,772 |
| [22] | Filed | Mar. 26, 1969 |
| [45] | Patented | May 25, 1971 |
| [73] | Assignee | British Cast Iron Research Association |
| | | Birmingham, England |
| [32] | Priority | Mar. 27, 1968 |
| [33] | | Great Britain |
| [31] | | 14,654/68 |

[54] APPARATUS FOR MAKING FOUNDRY CORES AND MOULDS
5 Claims, 3 Drawing Figs.

[52] U.S. Cl. .................................................. 164/200, 259/18
[51] Int. Cl. .................................................. B22c 15/24
[50] Field of Search .......................................... 164/186, 193, 198, 200, 228, 306, 15, 16, 43, 37, 201, 234; 259/418, 19, 20

[56] References Cited
UNITED STATES PATENTS

| 1,801,978 | 4/1931 | Prince | 164/234X |
| 3,439,733 | 4/1969 | Miller | 164/200 |
| 3,472,307 | 10/1969 | Godding | 164/43X |

Primary Examiner—J. Spencer Overholser
Assistant Examiner—John S. Brown
Attorney—Scrivener, Parker, Scrivener & Clarke ABSTRACT: In the production of sand-based foundry cores and mould bodies by a substantially cold curing process employing a resin and a catalyst, charges of sand containing resin and sand containing catalyst are prepared in separate driven mixer-feeder units forming part of apparatus incorporating separate chambers into which the charges from the mixer-feeder units are fed and from which they are blown into a common reaction chamber, the mixture then being blown from that chamber into a core-box or mould.

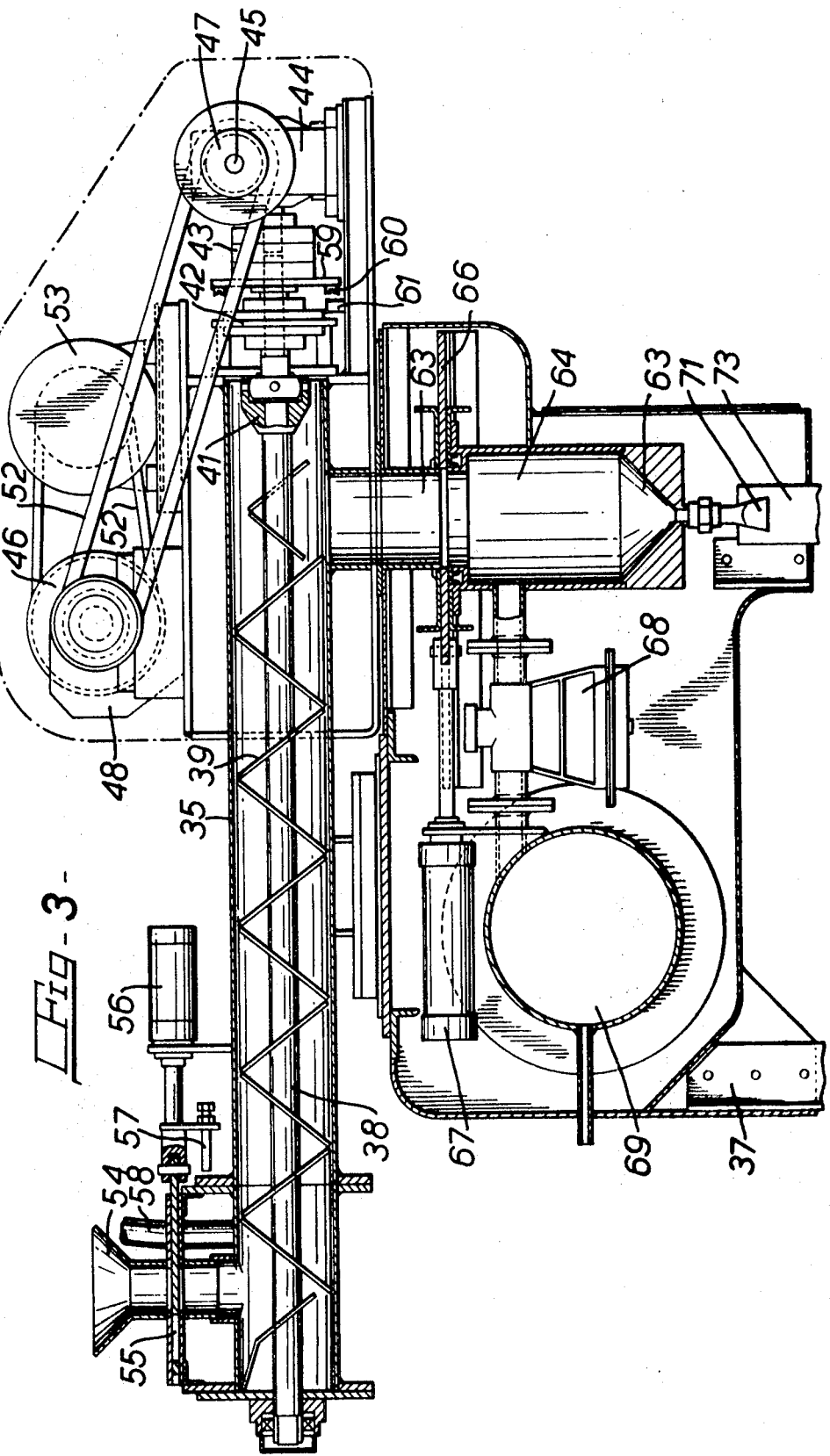

APPARATUS FOR MAKING FOUNDRY CORES AND MOULDS

The specification of U.S. Pat. Ser. No. 3,472,307 filed in the name of Ronald George Godding, assignor to British Cast Iron Research Association, describes and claims a method of forming sand-based foundry cores and mould bodies by a substantially cold curing process employing a resin and a catalyst in which two separate charges of foundry sand are formed, one containing the resin and the other containing the catalyst, and the two charges are fed into measuring chambers from which they are blown by gas pressure simultaneously into a common reaction chamber, and the mixture formed in that chamber is then transferred substantially immediately into a cavity to form the said body.

In the preferred apparatus illustrated in the drawing accompanying that specification the mixing of the resin with one charge of sand and of the catalyst with the other charge of sand are effected before the sand reaches the apparatus, the ready mixed materials being supplied to individual storage hoppers at the top of the apparatus from which the materials pass into measuring chambers, and the materials are then blown together from these chambers into the common reaction chamber.

An object of the present invention is to provide improved apparatus which requires no separate plant for premixing the respective charges of sand/resin mix and sand/catalyst mix.

According to our invention apparatus for forming sand-based foundry core and mould bodies by a substantially cold curing process employing a resin and a catalyst, comprises two rotary mixer-feeder units, means for feeding sand to both units and means for feeding liquid resin to one unit and liquid catalyst to the other, means for driving the units and means for controlling the duration of driving, separate chambers for receiving the charges from the respective units, means for closing off said chambers from the units, means for blowing the charges from said chambers into a common reaction chamber, and means for blowing the mixture formed in the reaction chamber into a core box or mould.

The mixer-feeder units are conveniently driven by an electric motor through a clutch or clutches and reduction gearing.

If the two charges formed by the mixer-feeder units are to be of equal weight both units may be driven through a single clutch which can be controlled by an electronic counter arranged to disengage the clutch when the shafts of the units have completed a preset number of revolutions.

If the two charges are to be of different weight this can be arranged in various ways. In one method the amount of sand fed into each mixer-feeder unit can be metered or adjusted by varying the sizes of separate openings in a gate valve through which sand is fed into the respective units.

Alternatively, each mixer-feeder unit may be driven through a separate clutch controlled by a counter or other means which disengages the clutch after the shaft of the unit has completed a predetermined number of revolutions, thus allowing one mixer-feeder unit to run for a longer period than the other.

The resin is fed in liquid form to a point near the input end of one mixer-feeder unit and the catalyst, also in liquid form, is fed to a corresponding point in the other mixer-feeder. The resin and catalyst are conveniently fed from variable speed positive displacement metering pumps in a separate control console. Normally, the motors driving the resin and catalyst pumps will be switched on and off simultaneously with the engagement and disengagement of the drives to the two mixer-feeder units, the duration of running determining the overall quantity of material supplied in each cycle, while the relative quantities are preset by the capacities and speed of rotation of the pumps.

One example of a machine in accordance with our invention for making foundry cores is illustrated in the accompanying drawings, in which:

FIG. 3 is a longitudinal vertical section taken on the axis of one of the mixer-feeders.

Figure 1:
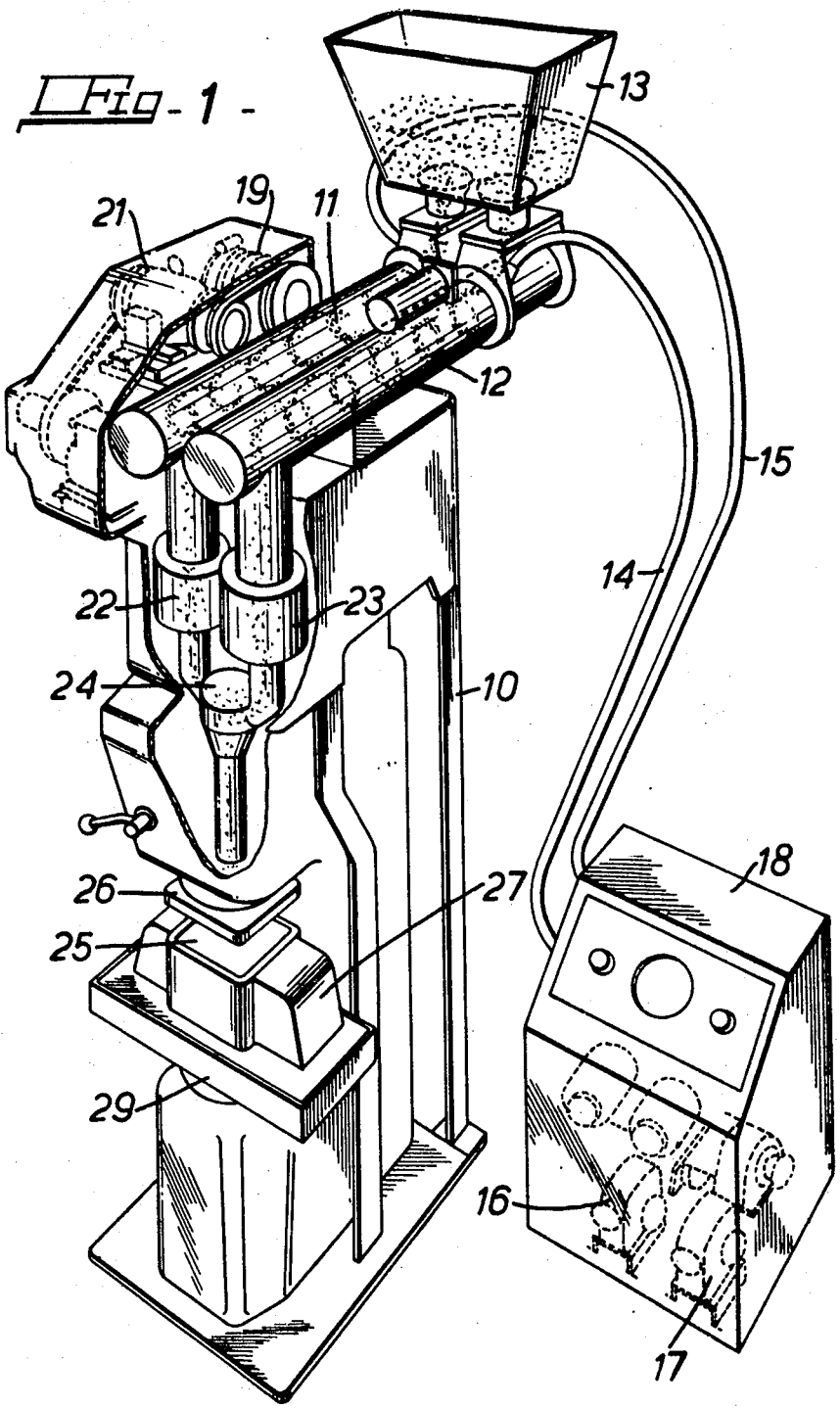
FIG. 1 is a diagrammatic perspective view of the general layout of the complete machine.

In the machine shown diagrammatically in FIG. 1, 10 is the frame of the machine on the upper end of which are mounted two parallel horizontal mixer-feeder units 11, 12. Each unit comprises a cylindrical body and a rotatable shaft extending axially through the body and carrying a series of inclined mixing blades.

The units are fed with sand under gravity from a hopper 13 located above the units at one end, the flow of sand from the hopper into the units being controlled by a pneumatically operated gate valve.

Liquid catalyst and liquid resin are supplied to the respective mixing units at the feed end through pipes 14, 15 from positive displacement metering pumps 16, 17 located in a console 18.

The shafts of the mixer-feeder units are driven through transmission mechanism (not shown) from a clutch and brake unit 19 which is driven by an electric motor 21. The charges from the mixer-feeder units are fed into blowing chambers 22, 23 and from there they are discharged by compressed air into a high-speed reaction chamber 24 where they mix and from which they are blown into a core box 25 through a blowing head 26.

It will be appreciated that all the various operations in the forming of a core are sequenced and controlled by well-known electropneumatic means which need not be described in detail.

The sequence of operations is as follows:

The operator presses in a button on the console which starts the motor 21, but the shafts of the mixer-feeder units are not driven as the clutch is disengaged. An electronic counter device is preset to the number of revolutions of the shafts of the mixer-feeder units required to produce a given weight of charge.

The operator next presses in a further button which activates pneumatically operated jaws 27 to clamp the core box 25 to the table 29 and raise the table to clamp the core box against the blowing head 26.

The operator next presses in an automatic sequence button which initiates the automatic cycle provided there is sand in the hopper and the core box is in the clamped position. The clutch in the drive to the shafts of the mixer-feeder units is engaged and each makes a number of revolutions sufficient to mix and meter the correct quantities of sand/resin and sand/catalyst which are delivered to the blowing chambers 22, 23.

The gate valve between the sand hopper and the mixer-feeder unit is closed and another gate valve at the upper end of the blowing chambers is also closed. An air valve is then opened to blow the charges from the blowing chambers through the reaction chamber, where they mix, and into a core-shooter machine from which the mixture is finally discharged into the core box in the normal way.

Figure 2:
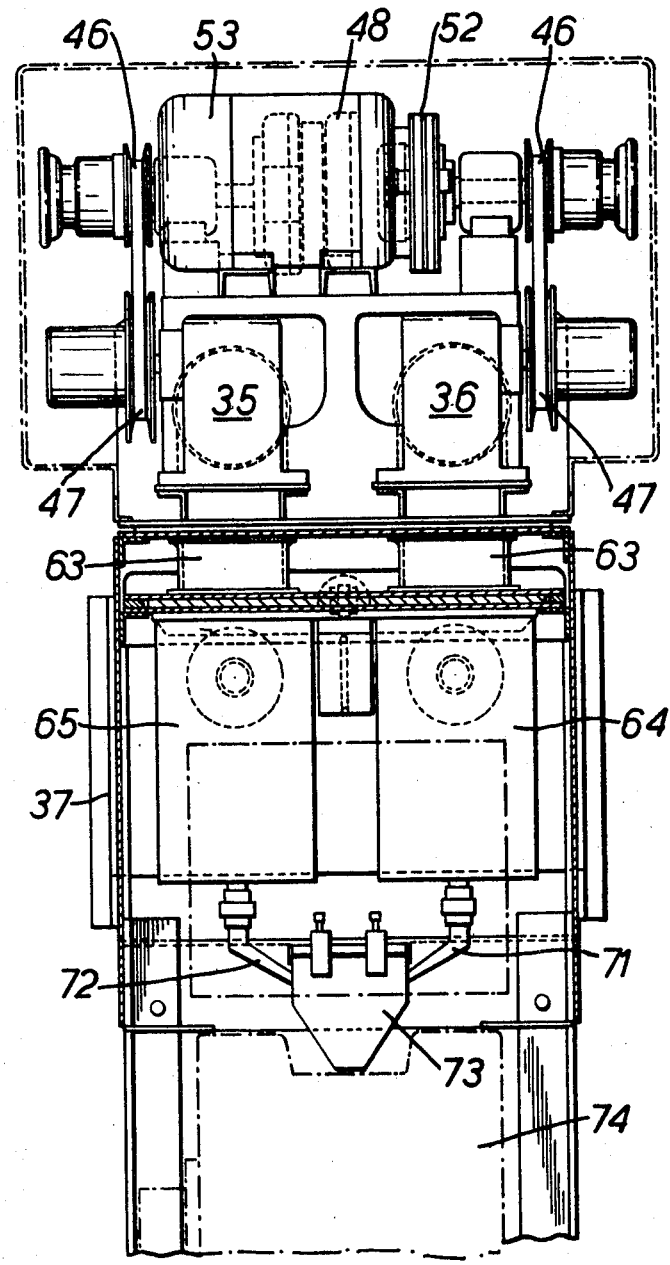
FIG. 2 is a front elevation of the upper part of the machine partly in section.

The actual relationship between the various parts of the machine and the practical details are shown in FIGS. 2 and 3.

The two mixer-feeder units 35, 36 are mounted side-by-side with their axes parallel and horizontal in the upper part of the frame 37 of the machine.

Each comprises a cylindrical housing in which works a rotating shaft 38 carrying inclined or part-helical mixing and feeding blades 39. Each shaft is driven through a coupling 41, a bearing 42 and a coupling 43 from the output shaft of a gearbox 44. The output shaft is driven through a worm and worm wheel from an input shaft 45 driven through a belt and variable speed pulleys 46, 47 from the output shaft of a clutch and brake assembly 48. The output shaft extends through the brake and clutch assembly and the pulleys 46 driving the mixer-feeder units are mounted on opposite ends of the shaft. The clutch and brake assembly 48 is driven by belts 52 from an electric motor 53.

Sand is fed to the ends of the mixer-feeder units from a hopper 54 under the control of a sliding gate valve 55 operated by a pneumatic cylinder 56.

An adjustable stop 57 is provided to control the extent to which the gate valve 55 is opened, and where it is desired that different amounts of sand are supplied to the mixer-feeder units the openings in the gate valve leading to the respective units may be of different areas.

Liquid resin is added to the sand in one mixer-feeder unit and liquid catalyst is added to the sand in the other unit as described above in relation to FIG. 1. The resin and catalyst are introduced through pipes adjacent to the sand feed, one pipe being shown at 58 in FIG. 3.

The charge in each unit is mixed and fed along in a direction away from the sand hopper, the amount of the charge being determined by the number of revolutions made by the shafts of the units as controlled by any suitable form of counting device.

One convenient form of counting device is shown in FIG. 3. It comprises a disc 59 mounted on the shaft of the mixer-feeder unit between the bearing 42 and the coupling 43. The disc carries four magnets 60 spaced angularly at 90° from each other and as the shaft rotates the magnets pass in close proximity to a reed switch 61 which completes an electrical circuit as each magnet passes it.

The charges from the two units are delivered through passages 63 leading out of the units into blowing chambers 64 and 65.

When the predetermined number of revolutions of the shafts of the mixer-feeder units has been completed the clutch in the drive is disengaged, a gate valve 66 at the upper ends of the blowing chambers is closed by a pneumatic cylinder 67, and an air valve 68 is opened to admit compressed air from a reservoir 69 to the upper ends of the blowing chambers. The charges in the two chambers are blown through nozzles 71 72 into a reaction chamber 73 where they mix, and the resultant mixture passes into a conventional core-shooter machine, of which a part is shown at 74 in FIG. 2, for final discharge into a core box in a normal manner.

I claim:

1. Apparatus for forming sand-based foundry core and mould bodies by a substantially cold curing process employing a resin and a catalyst, comprising two rotary mixer-feeder units, means for feeding sand to both units and means for feeding liquid resin to one unit and liquid catalyst to the other, means for driving the units and means for controlling the duration of driving, separate chambers for receiving the charges from the respective units, means for closing off said chambers from the units, means for blowing the charges from said chambers into a common reaction chamber, and means for blowing the mixture formed in the reaction chamber into a core box or mould.

2. Apparatus as in claim 1, wherein each of said mixer-feeder units comprises a cylindrical housing, a rotatable shaft extending axially within the housing, and part-helical mixing and feeding blades mounted on said shaft, and means are provided for feeding sand and either a resin or a catalyst into said casing at one end and for delivering the mixed charge from the other end of said casing.

3. Apparatus as in claim 1, wherein said means for driving the mixer-feeder units comprises an electric motor, a clutch and brake assembly driven by said motor, and belt drives from said clutch and brake assembly to reduction gear boxes and couplings between said gear boxes and said units.

4. Apparatus as in claim 1 incorporating a clutch in the means for driving said mixer-feeder units, mechanism for counting the revolutions of the units, and control means for said clutch actuated by said counting mechanism.

5. Apparatus as in claim 1, wherein said means for feeding resin and catalyst in liquid form to said mixer-feeder units comprises two variable speed positive displacement driven pumps and means for controlling the periods for which said pumps are driven.